United States Patent [19]

Suzuki et al.

[11] 4,383,359

[45] May 17, 1983

[54] PARTS FEEDING AND ASSEMBLING SYSTEM

[75] Inventors: Takamichi Suzuki; Tomoaki Sakata; Koichi Sugimoto; Michinaga Kohno, all of Yokohama, Japan

[73] Assignee: Hitachi, Ltd., Tokyo, Japan

[21] Appl. No.: 186,151

[22] Filed: Sep. 10, 1980

[30] Foreign Application Priority Data

Sep. 11, 1979 [JP] Japan .................. 54-115657

[51] Int. Cl.³ .................. B23P 19/04; B23P 21/00
[52] U.S. Cl. .................. 29/712; 29/742; 29/759; 29/783; 29/794
[58] Field of Search .................. 29/701, 702, 703, 704, 29/709, 711, 712, 742, 759, 783, 784, 787, 791, 794, 795

[56] References Cited

U.S. PATENT DOCUMENTS

| 3,852,865 | 12/1974 | Ragard | 29/701 X |
| 3,968,558 | 7/1976 | Sekine et al. | 29/783 X |
| 4,107,838 | 8/1978 | Keen et al. | 29/703 X |
| 4,209,898 | 7/1980 | Aoki et al. | 29/783 |

Primary Examiner—Ervin M. Combs
Attorney, Agent, or Firm—Antonelli, Terry & Wands

[57] ABSTRACT

A parts feeding and assembling system including a plurality of stockers containing a multiplicity of parts arranged in a disorderly manner, a separating and feeding mechanism for separating one part after another from the parts in the stockers and feeding same to a predetermined station, a tentatively positioning mechanism for tentatively positioning each part fed to the station by the separating and feeding mechanism, a parts posture discriminating mechanism for discriminating the posture of each part including the position and direction tentatively positioned by the tentatively positioning mechanism, a parts posture changing mechanism for changing the posture of each part in accordance with the result of discrimination of the part effected by the parts posture discriminating mechanism and an assembling mechanism for assembling each part in a predetermined position of an assembly of parts after the part has had its posture changed. The assembling mechanism and the parts posture changing mechanism may be formed into an assembling robot.

6 Claims, 30 Drawing Figures

PARTS FEEDING AND ASSEMBLING SYSTEM

BACKGROUND OF THE INVENTION

This invention relates to a parts feeding and assembling system of high versatility which is convenient for use in assembling parts of a large variety or requiring changes in design from time to time.

Figure 1:
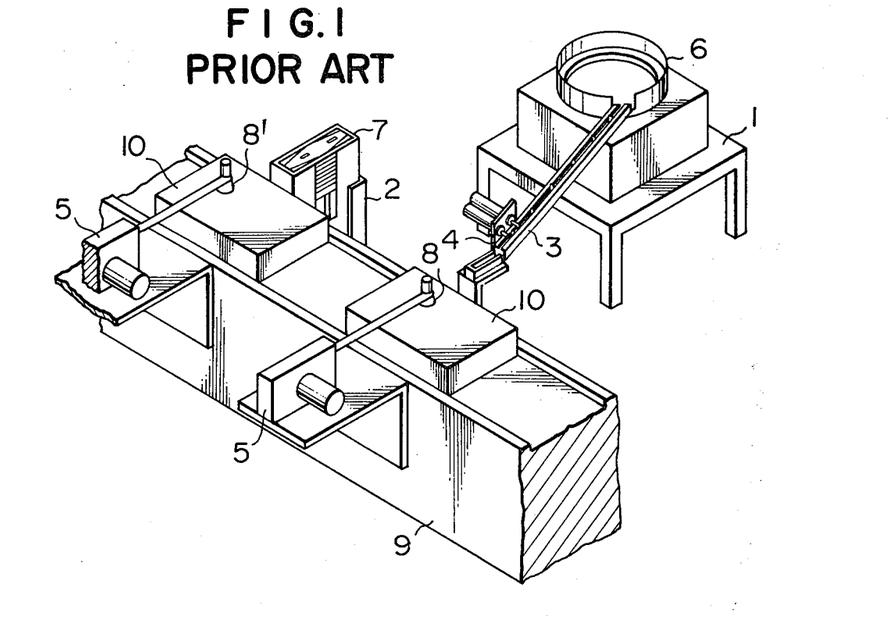
FIG. 1 is a schematic perspective view of a parts feeding and assembling system of the prior art.
Figure 2:
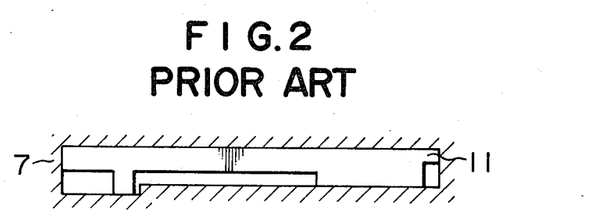
FIG. 2 is a sectional view of a magazine of the prior art.
Figure 3:
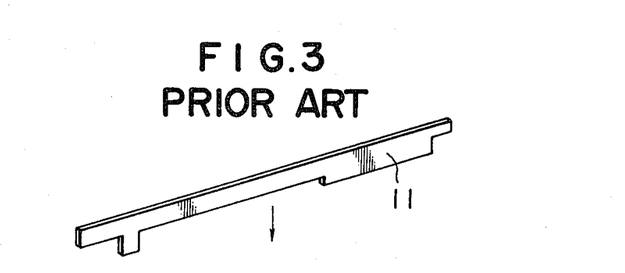
FIG. 3 is a perspective view of a plate-shaped part in a standing position.

One type of parts feeding and assembling system known in the art is disclosed in U.S. Ser. No. 940,353 now U.S. Pat. No. 4,209,898 and comprises, as shown in FIG. 1, a parts feeding device comprising a vibration feeder 1 and a magazine feeder 2, a conveyor chute 3 connected at its starting end to a parts outlet of a bowl 6 of the vibration feeder 1, a separation unit 4 located at a terminating end of the conveyor chute 3 for separating one part from another part as the parts are conveyed by the conveyor chute 3, and a pick-and-place type assembling unit 5 including chucks 8 and 8' for holding each of the parts separated by the separation unit 4 and each of the parts stored in an array in a magazine 7 of the magazine feeder 2 respectively and assembling same on a chassis 10 on a line conveyor 9. The vibration feeder 1 which is used for feeding parts of small size (particularly those parts which can be readily caused to vibrate) includes drawing-up means, not shown, disposed in the bowl 6 for arranging the parts in a desired order and in a desired posture, the parts being fed in the desired posture from the parts outlet of the bowl 6 through the conveyor chute 3 to the separation unit 4 where the parts are separated and assembled on the chassis 10 by the assembling unit 5. Meanwhile the magazine feeder 2 is used for feeding those parts which cannot readily be caused to vibrate, such as plate-shaped parts, and includes a magazine 7 in which plate-shaped parts 11 are set in a condition in which they are all correctly arranged with respect to front and rear, right and left and surface and undersurface. The plate-shaped parts 11 set in this manner are assembled on the chassis 10 while being maintained in the same posture, or, when the plate-like parts 11 are assembled in a condition in which the plate-shaped part 11 is standing at right angles as shown in FIG. 3, are withdrawn from the magazine 7 while being maintained in the same posture as they were set at the magazine 7 and have their posture changed on their way to the chassis 10 by posture changing means, not shown, into a right-angle position before being assembled on the chassis 10.

Some disadvantages are associated with the parts feeding and assembling system of the prior art. First, each part is brought to a predetermined posture and fed and assembled while being maintained in the predetermined posture. Thus the system can handle only one type of parts. That is, the drawing-up means on the bowl 6 is constructed to draw up the parts in a predetermined posture, and the conveyor chute 3 are constructed to convey the parts while restraining the parts in the predetermined posture. The magazine 7 is constructed in a plate-like shape which does not disturb the plate-like parts 11 set in a condition in which they are correctly arranged with respect to front and rear, left and right and surface and undersurface. Thus the bowl 6, conveyor chute 3 and magazine 7 are constructed to exclusively handle one type of parts, and when other type of parts are to be fed and assembled, the bowls 6, conveyor chute 3 and magazine 7 should be replaced by those which suit the shape of the other type of parts. For this reason alone, the parts feeding and assembling system of the prior art is not suitable for handling parts which have their shape changed from time to time or which are of a large variety but produced in small numbers.

SUMMARY OF THE INVENTION

This invention has been developed for the purpose of obviating the aforesaid disadvantages of the prior art. Accordingly, the invention has as its object the provision of a parts feeding and assembling system having high versatility which is suitable for handling parts which have their shape changed from time to time or which are of a large variety but produced in small numbers.

In the parts feeding and assembling system of the prior art, the posture of the parts is first corrected and the parts are transferred to a predetermined position while being maintained in the correct posture. Then the parts are assembled on a semi-finished product by a pick-and-place technique. According to the invention, however, the parts feeding and assembling system comprises at least one stocker for storing a large number of parts, separating and feeding means for separating and feeding one part after another from the parts stored in the stocker to a predetermined station, tentatively positioning means for tentatively positioning the part in the predetermined station after being separated and fed by the separating and feeding means, parts posture discriminating means for discriminating the posture including position and direction of the tentatively positioned part, and parts posture changing means for changing the posture including position and direction of the tentatively positioned part in accordance with the result of operation of the parts posture discriminating means, whereby the system can accommodate variations in the parts assembling position by altering the program when such variations are made necessary by changes in the parts handled. The system according to the invention enables parts to be fed irrespective of their posture and then assembled after having the posture corrected. This makes it necessary to cope with a change in the type of the parts handled without requiring to change the mechanism of the system, and different types of parts can be readily fed and assembled merely by changing the program. Particularly, the provision of the tentatively positioning means greatly facilitates discrimination of the posture of the part by the parts posture discriminating means, and enables the direction $\theta$ of the part to be changed readily by an assembling robot, because the amount of change of the direction $\theta$ of the part can be obtained as a definite value, such as 90 degrees or 180 degrees.

In the invention, visual discrimination means may be used as the parts posture discriminating means, so that the posture of the parts can be readily discriminated.

In the invention, the tentatively positioning means is kept at an essential minimum in the number n of its units to enable the assembling robot to operate fully, and parts separated and fed from the stocker are suitably joined to one another and fed to the tentatively positioning means. That is, the number n of the units of the tentatively positioning means is kept at $n = m/2$ where m is the number of parts assembled to form one finished product, so as to simplify the construction of the parts feeding and assembling system. Thus the system according to the invention is economical to build and use.

In the invention, the tentatively positioning means may be provided with an inverting means which arranges the parts correctly with regard to surface and undersurface by inverting those parts which are not correctly positioned, so that a single assembling robot can perform an operation which would otherwise require an additional robot to perform.

DESCRIPTION OF THE PREFERRED EMBODIMENTS

Preferred embodiments of the parts feeding and assembling system in conformity with the invention will be described by referring to FIGS. 4-30.

Figure 4:
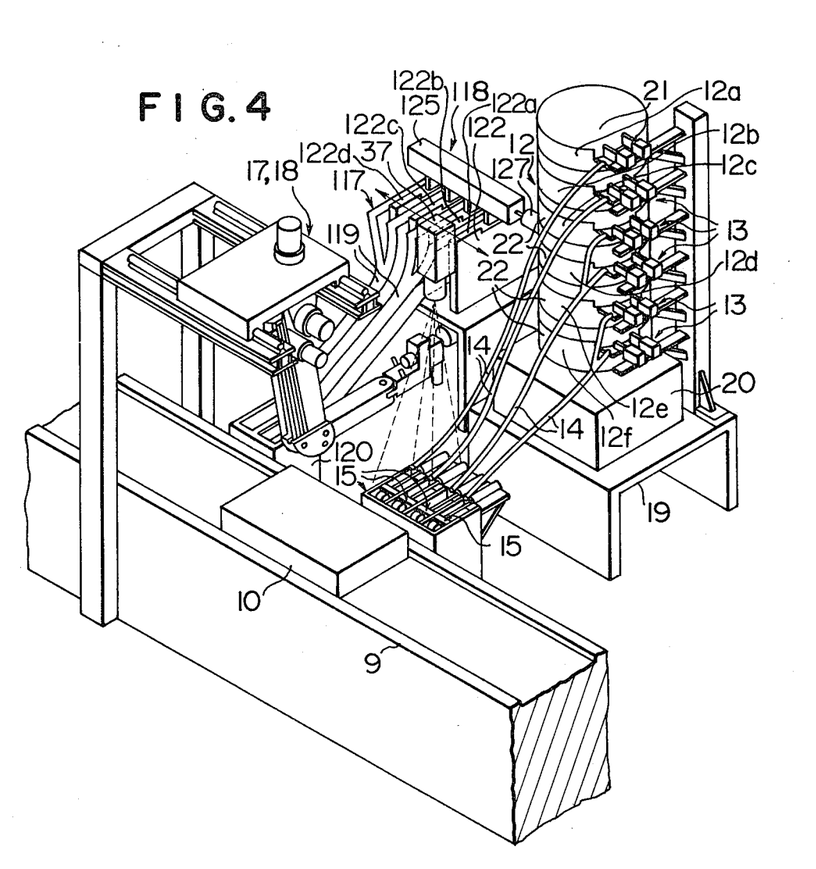
FIG. 4 is a schematic perspective view of the parts feeding and assembling system comprising one embodiment of the present invention.

FIG. 4 shows in a perspective view a first embodiment of the invention. The parts feeding and assembling system comprises a multiple stage vibration feeder 12 separating one part, such as a shaft, from a plurality of parts and feeding same, a separation unit 13, conveyor chute means 14, parts positioning means 15 disposed at a terminating end of the conveyor chute means 14 for tentatively positioning the separated and fed parts, parts discriminating means 16 for discriminating the type and posture of the parts temporarily positioned by the parts positioning means 15, parts posture changing means 17 for changing the posture (direction and position) of the parts temporarily positioned by the parts positioning means 15 in accordance with the results of discrimination performed by the parts discriminating means 16, and assembling means 18 for assembling in a predetermined position on a chassis 10 on a line conveyor 9 the parts that have their posture changed by the parts posture changing means 17. The parts posture changing means 17 and the assembling means 18 are formed into an assembling robot that has the function of changing the posture of the parts. A device comprising, means designated by the numerals 12, 13, 14 and 15 is a device for separating, feeding and positioning elongated parts, such as shafts, and a device comprising means designated by the numerals 117, 118, 119 and 120 is a device for separating, feeding and positioning plate-shaped parts. The two devices are arranged in side-by-side relation.

Figure 5:
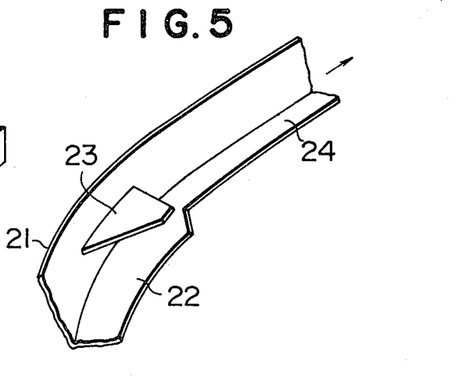
FIG. 5 is a fragmentary perspective view of the drawing-up means disposed in the bowl.

The multiple stage vibration feeder 12 has six bowls 21 arranged one over another in superposed relation mounted on a table 19 through a vibration producing section 20. The bowls 21 are each formed therein with a conveying passage 22 for feeding therethrough parts of types of a substantial range, and each conveying passage 22 mounts a wiper 23 and is formed with a narrowed passage portion 24 as shown in FIG. 5, to feed the parts in one layer and in a single file.

Figure 6:
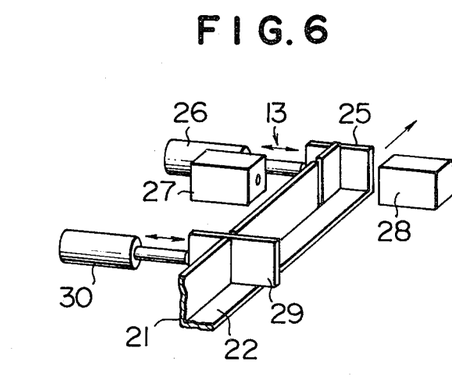
FIG. 6 is a fragmentary perspective view of the separation unit disposed in the bowl.

As shown in FIG. 6, the separation unit 13 is disposed at an outlet of the narrowed passage portion 24 of the bowl 21 and comprises a stop blade 25 mounted for movement into and out of the narrowed passage portion 24, a cylinder 26 for actuating the stop blade 25, photoelectric sensing means including a light projector 27 and a light receiver 28 disposed on opposite sides of the narrowed passage portion 24 upstream of the stop blade 25 with respect to the direction of movement of the parts, an escape blade 29 mounted for movement into and out of the narrowed passage portion 24 in a position upstream of the photoelectric sensing means with respect to the direction of movement of the parts, and a cylinder 30 for driving the escape blade 29.

The conveyor chute means 14 is of a construction enabling the parts of a substantial variety to be conveyed in free posture located between the stop blade 25 of the separation unit 13 and the parts positioning means 15 in a manner to allow the parts to join one another in accordance with the number of parts assembled to produce a finished product.

As the vibration section 20 of the multiple stage vibration feeder 12 is caused to vibrate, the parts in each bowl 21 is moved and conveyed along the conveying passage 22 by the vibratory movement of the vibration section 20. In moving along the conveying passage 22, an upper part or parts of the overlapping parts are eliminated by the wiper 23 to arrange the parts in a single layer, and an inner part or parts of the parts arranged in a row drop onto the bowl 21 as they move along the narrowed passage portion 24 to arrange the parts in a single file. Thus the parts are arranged in a single layer and single file as they reach the separation unit 13. In the separation unit 13, the stop blade 25 is disposed in the narrowed passage portion 24 to obstruct the movement of the parts and the escape blade 29 is not disposed in the passage 24. Thus the leading part passes by the escape blade 29 and is sensed by the photoelectric means including the light projector 27 and the light receiver 28. The photoelectric means produces a signal which actuates the cylinder 30 to move the escape blade 29 into the narrowed passage portion 24, to obstruct movement of the next following part. Thus one part is separated from the rest of the parts between the stop blade 25 and escape blade 29. Then the cylinder 26 is actuated to move the stop blade 25 out of the narrowed passage portion 24, and the separated part passes by the stop blade 25 and reaches one of the chute elements of the conveyor chute means 14. The part passes through the conveyor chute means 14 in free posture, and several parts are joined to one aother and fed to the parts positioning means 15. The aforesaid operation is repeated so as to feed the separated parts one after another to the parts positioning means 15.

Figure 7:
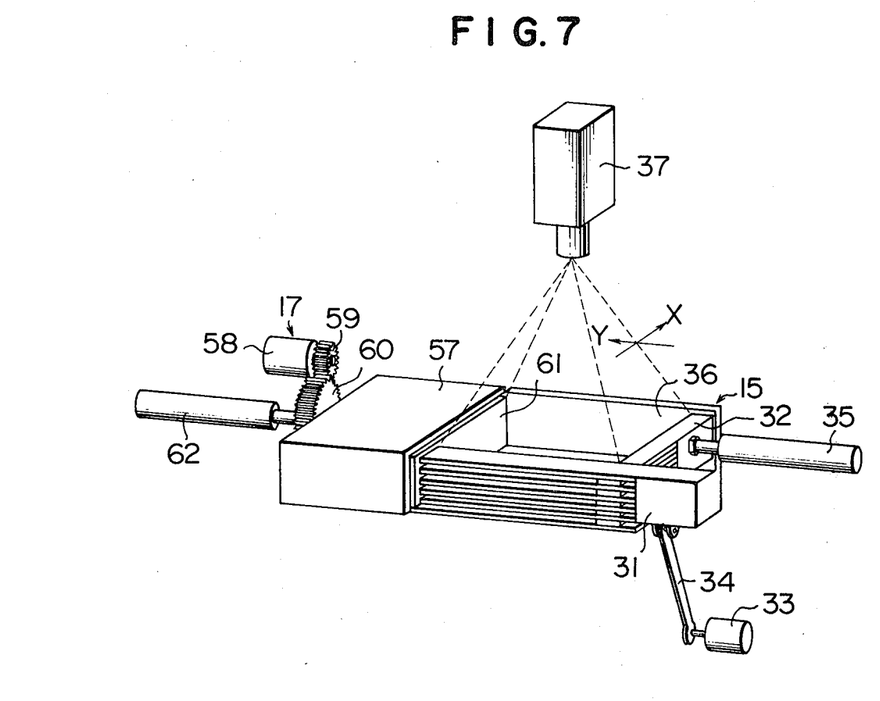
FIG. 7 is a perspective view of the parts positioning means and the inverting means of the parts posture changing means.

The parts positioning means 15 is located at the terminating end of the conveyor chute means 14 and includes four positioning elements. Each positioning element includes an X-direction pusher member 31 and a Y-direction pusher member 32 arranged for reciprocatory movements in directions normal to each other, the members 31 and 32 being formed of thin layers arranged in the form of a comb, a drive motor 33 and a lever 34 for moving the X-direction pusher member 31 in one direction only or in the X-direction, a cylinder 35 for moving the Y-direction pusher member 32 in a direction normal to the direction of reciprocatory movement of the X-direction pusher member 31 or in a Y-direction, for example, and a fixed plate 36 disposed parallel to the X-direction pusher plate 31. The X-direction pusher member 31, Y-direction pusher member 32 and fixed plate 36 cooperate with a pusher member 61 of the inverting section of the parts posture changing means 17 subsequently to be described to provide a rectangular frame. As a part is fed by the conveyor chute means 14 into the frame formed by the X-direction pusher member 31, Y-direction pusher member 32, fixed plate 36 and pusher member 61, the drive motor 33 is actuated to move through the lever 34 the X-direction pusher member 31 in the direction of the arrow X to force the part in the frame against the fixed plate 36. Then the cylinder 35 is actuated to move the Y-direction pusher member in the direction of the arrow Y to force the part, which is in pressing engagement with the fixed plate 36 in the frame, against the pusher member 61, to thereby tentatively determine the position of the part. By tentatively determining the position of the part as described hereinabove, discrimination of the posture of the part by the parts posture discriminating means 16 is greatly facilitated. If the position of the fed part were not determined, it would be necessary to effect fine movements in the Y-direction and rotation of a dictionary of a shape similar to that of the part, to discriminate the posture of the part. This would be time-cosuming.

Figure 8:
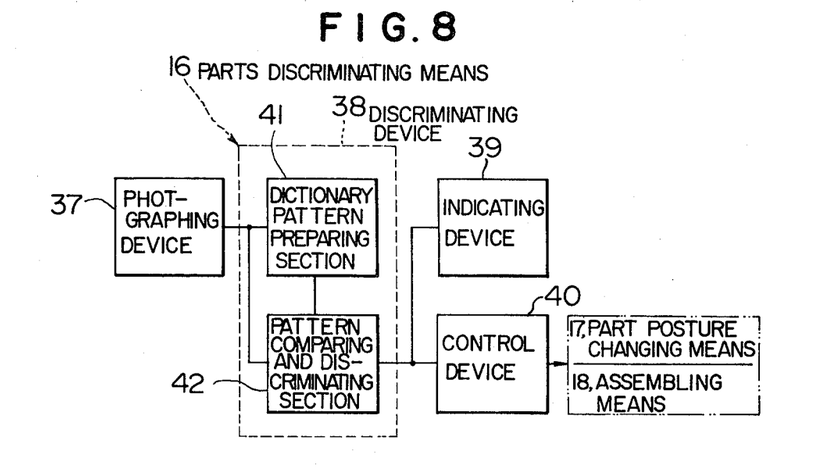
FIG. 8 is a block diagram of the parts discriminating means.

The parts discriminating means 16 comprises a photographing device 37, such as a TV camera, disposed above the parts positioning means 15, a discriminating device 38, an indicating device 39 and a control device 40. The photographing device 37 is expensive, so that one unit 37 is mounted on rails above the parts positioning means 15 for movement along the rails to change its position. The control device 40 controls the operation of the parts posture changing means 17 in accordance with the result of discrimination of the part effected by the discriminating device 38, so as to change the posture of the part to a predetermined posture.

The discriminating device 38 comprises a dictionary pattern preparing section 41, and a pattern comparing and discriminating section 42. The operation thereof will be described hereinafter.

Figure 9:
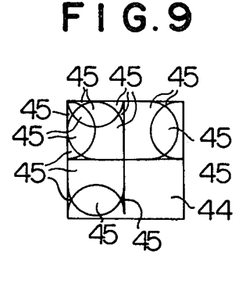
FIG. 9 is a view in explanation of images of the overlapping parts and their partial regions.
Figure 10:
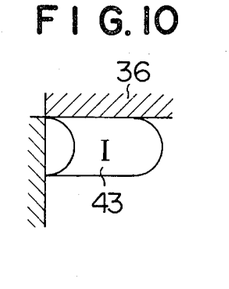
FIGS. 10-13 are views in explanation of various postures of the part.
Figure 11:
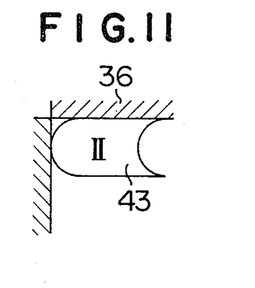
Figure 12:
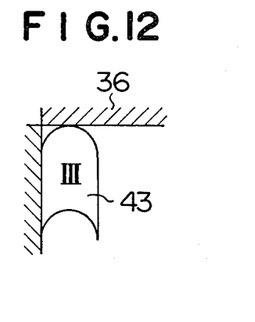
Figure 13:
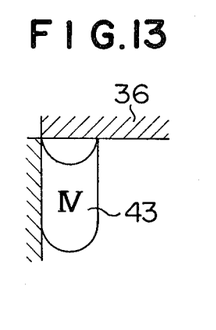
Figure 14:
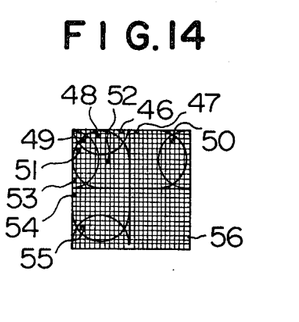
FIG. 14 is a view in explanation of the reference points.
Figure 15:
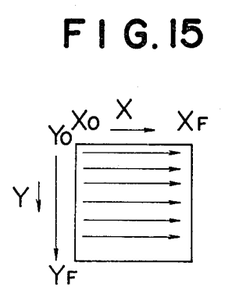
FIG. 15 shows an example of scanning of the image.

Preparation of a reference point pattern will be first described. FIG. 9 shows image information on the overlapping postures I, II, III and IV of a part 43 shown in FIGS. 10–13. The overlapping postures of the picture information 44 form closed partial zones 45 at the boundary of the postures. The part 43 shown forms nineteen (19) partial zones 45. One picture element of each of the plurality of partial zones 45 is set as a reference point. FIG. 14 shows one example of setting the reference points, in which ten reference points 46, 47 . . . 54 and 55 are set. The reference points 46, 47 . . . 54 and 55 each represent a complete picture element 56 (square shape). Thus no reference points are set unless a reference point representing one picture element can be set in the partial zone. In a partial zone in which a number of picture elements exist which each permit a reference point to be set, scanning is performed from $X_o$ to $X_F$ with $Y=Y_o$ and then from $X_o$ to $X_F$ with $Y=Y_o+1$, as shown in FIG. 15. In like manner, scanning is carried out up to $Y_F$ so as to scan all the picture. In this scanning process, the reference point at the top of the rank in the order of reference for a partial zone concerned is set as the reference point of the partial zone concerned. Scanning is carried out, of course, in the same fashion with other partial zones. Setting of reference points relies on the aforesaid scanning.

Figure 16:
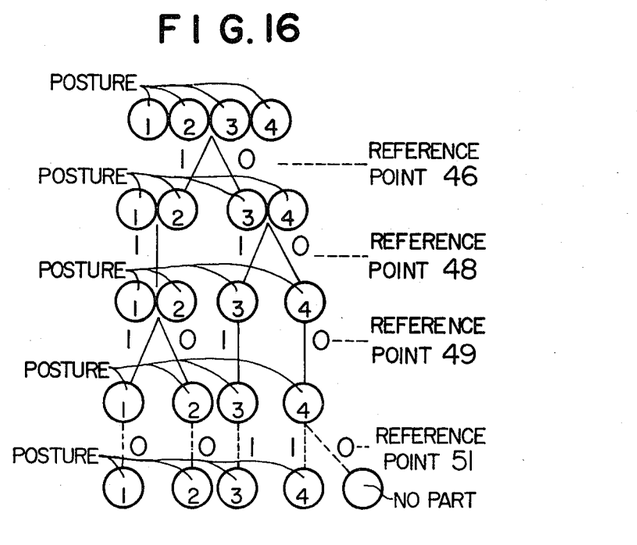
FIG. 16 is a view in explanation of the dictionary pattern.

Then selection of the reference points is carried out. FIG. 16 shows the process of selection in a tree structure. The reference point at the top of the order of reference in the process of scanning is the reference point 46 in the example shown in FIG. 14. Thus in FIG. 16, the postures I–IV is classified according to the picture element information at the reference point 46. A picture element 56 shown in FIG. 14 is represented by a binary system in which the presence of a part is indicated by a digit "1" and the absence of a part is indicated by a digit "0". Thus the postures I–IV are divided into two groups as shown in FIG. 16 by the digits "1" and "0" of the reference point 46. The next reference point in the order is reference point 47. However, since the picture element information at the reference point 47 is similar to that at the reference point 46, the reference point 47 is not adopted as a reference point. The standards of whether or not a reference point is selected are such that any reference point that carries information separating parts of any one of the postures from the group of parts of the postures is selected and any reference point that does not carry such separation information is not selected. For example, the reference points 46 and 52 are reversed from each other in picture element information "1" and "0", but they share the information of dividing the postures I–IV into postures I and II and postures III and IV, so that when one of them is selected the other is not selected.

By successively checking the reference points until all the postures are separated by the aforesaid standards, it is possible to discriminate between the postures I–IV by the reference points 46, 48 and 49. At this time, a dictionary pattern having in combination the reference points 46, 48 and 49 corresponding to the various postures is as shown in Table 1.

TABLE 1

| Posture | Reference Point | | | |
|---|---|---|---|---|
| | 46 | 48 | 49 | 51 |
| I | 1 | 1 | 1 | 0 |
| II | 1 | 1 | 0 | 0 |
| III | 0 | 1 | 1 | 1 |
| IV | 0 | 0 | 0 | 1 |
| No Part | 0 | 0 | 0 | 0 |

It is the posture IV that raises a problem at this time. In the posture IV, the reference points 46, 48 and 49 are all "0". Thus a judgement may be passed as if there were no parts. To distinguish between the state of no part and the posture IV, information on the presence or absence of a part with regard to the posture IV should be obtained from another source. If the state of no part is considered to represent one posture, all the postures including the reference point 51 could be discriminated, so that the dictionary pattern is added with information on the reference point 51 as shown in Table 1. Thus the dictionary pattern is stored in the memory in the dictionary pattern preparing section 41.

The operation of pattern comparison performed in actual practice will be described. The dictionary pattern described hereinabove is compared with the actual image information in the pattern comparing section 42 to find out if there is image information in the reference points in the dictionary pattern. If there is image information in the reference points concerned, it is possible to discriminate the posture in accordance with the reference points. The result obtained in discriminating the posture (including shape) of the part is transmitted to the control device 40.

The parts posture changing means 17 comprises an inverting section and an XYZ shifting section. The inverting section is unitary with the parts positioning means 16, and the XYZ shifting section is unitary with the assembling means 18. When the parts handled have no distinguishable surface and undersurface, as is the case with washers, there is no need to effect inversion of the parts.

The inverting section of the parts posture changing means 17 includes, as shown in FIG. 7, an inverting box 57 positioned against the Y-direction pusher member 32 of the parts positioning means 17 and rotatably supported, a drive motor 58 and gears 59 and 60 for rotating the inverting box 57, a pusher member 61 arranged in the inverting box 57 for sliding movement in the Y-direction and a cylinder 62 for moving the pusher member 61 in the Y-direction. When it is necessary to invert the part tentatively positioned by the parts positioning means 15 based on the result of discrimination by the parts discriminating means 16, the cylinder 62 is actuated to withdraw the pusher member 61 into the inverting box 57, and then the cylinder 35 is actuated to move the Y-direction pusher member 32 in the Y-direction, to force the part to move into the box 57. Then, the motor 58 is actuated to rotate the inverting box 57 through 180 degrees through the gears 59 and 60. Thereafter, the cylinder 62 is actuated to move the pusher member 61 in the reverse direction in sliding movement, to push the part out of the inverting box 57 which is changed to a predetermined posture by the XYZ shifting section of the parts posture changing means 17 and the assembling means 18 before being assembled on the chassis 10. Meanwhile the X-direction pusher member 31 and Y-direction pusher member 32 of the parts positioning means 15 are restored to their original positions to be ready for handling the next following part.

When there is no need to effect inversion of the part as the result of discrimination performed by the parts discriminating means 16, the part has its posture directly changed to a predetermined posture by the XYZ shifting section of the parts posture changing means 17 and the assembling means 18 and assembled on the chassis 10.

Figures 17, 18:
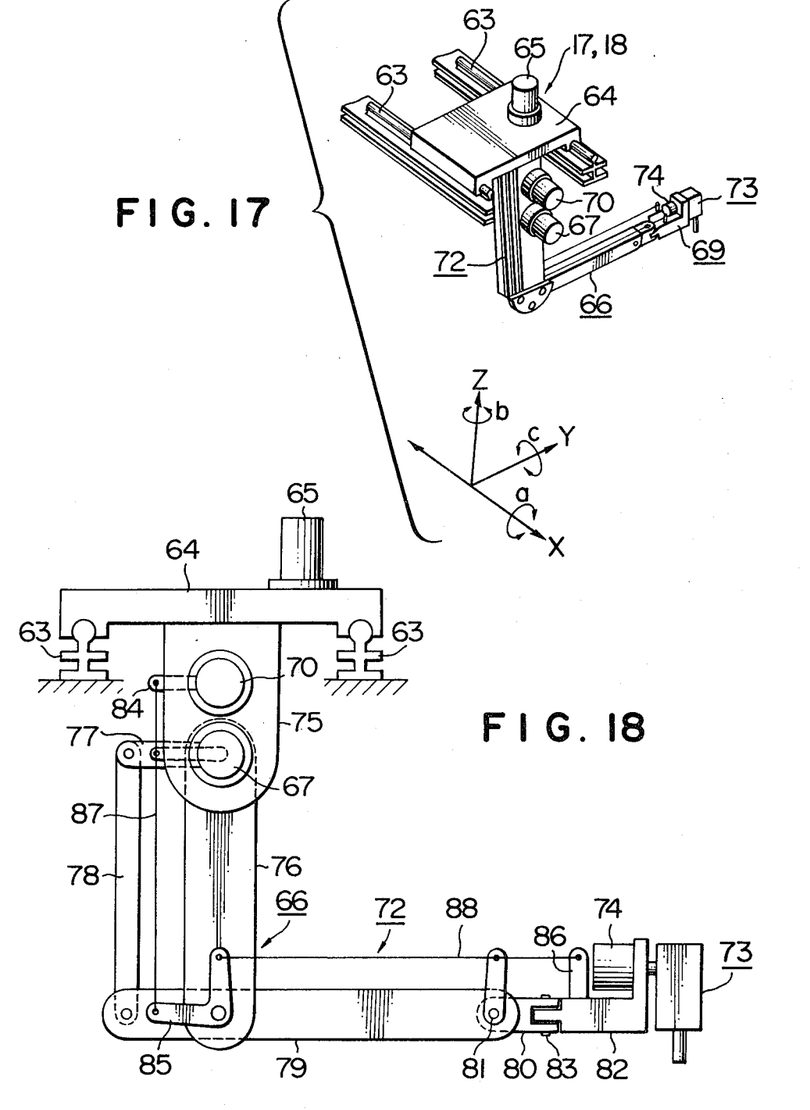
FIG. 17 is a perspective view of the parts posture changing means and the assembling means.
FIG. 18 is a side view of the parts posture changing means and the assembling means shown in FIG. 17.
Figure 19:
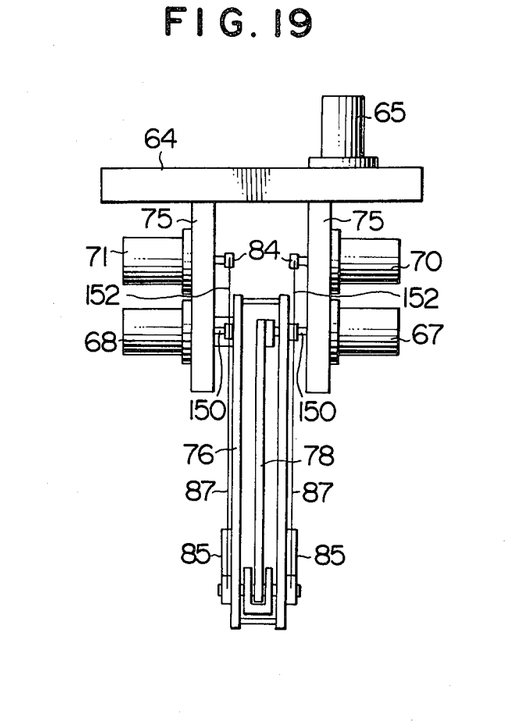
FIG. 19 is a rear view of the parts posture changing means and the assembling means shown in FIG. 17.
Figure 20:
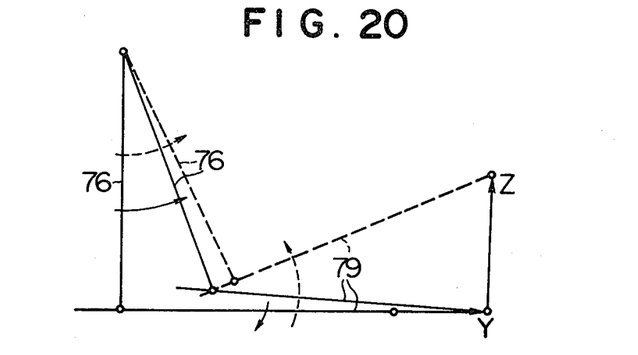
FIG. 20 is a diagram in explanation of the operation of the parts posture changing means and the assembling means.

The XYZ shifting section of the parts posture changing means 17 and the assembling means 18 include, as shown in FIG. 17, a carriage 64 engaging two guide rods 63 disposed parallel to the X-direction (direction of reciprocatory movement of the X-direction pusher member 61), a first DC servomotor 65 for moving the carriage 64, an arm 66 mounted on the undersurface of the carriage 64, a second DC servomotor 67 and a third DC servomotor 68 for actuating the arm 66, a wrist 69 connected to a forward end of the arm 66, a fourth DC servomotor 70, a fifth DC servomotor 71 and a linkage 72 for actuating the wrist 69, a chuck 73 attached to the wrist 69 and a sixth DC servomotor for rotating the chuck 73.

The arm 66 includes a first arm member 76, a second arm member 78 and a third arm member 79. The first arm member 76 is connected at one end thereof to an output shaft of the second DC servomotor 67 mounted, together with the third DC servomotor 68, on a pair of fixed plates 75 secured to the undersurface of the carriage 64 in parallel relation. The second arm member 78 is pivotally supported at one end thereof by one end of a bar 77 secured at the other end thereof to an output shaft of the third DC servomotor 68. The third arm member 79 is pivotally supported by the first arm member 76 and the second arm member 78 at the other end thereof. By suitably driving the second DC servomotor 67 and third DC servomotor 68, the wrist 69 connected to the other end of the third arm member 79 can be moved in the Y-direction (direction of reciprocatory movement of the Y-direction pusher member 32) and in a Z-direction (direction perpendicular to the X-direction and Y-direction).

Figure 21:
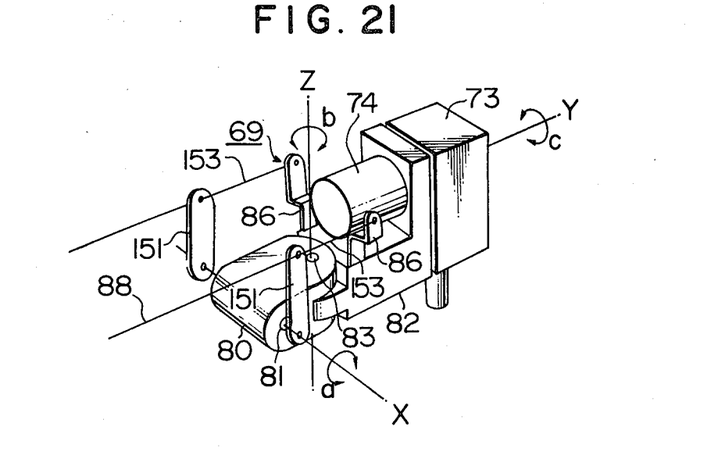
FIG. 21 is a perspective view of the wrist portion.

The wrist 69 includes a first wrist member 80 connected at one end thereof to the other end of the third arm member 79 through a first pin 81 parallel to the X-direction so that the wrist member 80 can rotate in the direction of an arrow a in FIG. 21, and a second wrist member 82 connected at one end thereof to the other end of the first wrist member 81 through a second pin 83 parallel to the Z-direction so that the wrist member 82 can rotate in the direction of an arrow b in the same figure. The linkage 72 for actuating the wrist 69 includes, as shown in FIG. 18, a fourth DC servomotor 70 and a fifth DC servomotor 71 mounted on the fixed plates 75, a bar 84 secured at one end thereof to output shafts of the servomotors 70 and 71 a first intermediate link 150 coaxially supported for pivotal movement at one end thereof by a shaft pivotally connecting the first arm member 76 to the fixed plates 75, an L-shaped link 85 pivotally connected at the center thereof to a shaft pivotally connecting the first arm member 76 to the fixed plates 75, a second intermediate link 151 coaxially supported for pivotal movement at one end thereof by a shaft pivotally connecting the third arm member 79 to the first wrist member 80, an upright member 86 projecting from the second wrist member 82, a first link member 152 pivotally connected at opposite ends thereof to the other end of the bar 84 and the other end of the first intermediate link 150 respectively, a second link member 87 pivotally connected at opposite ends thereof to the other end of the first intermediate link 150 and one end of the L-shaped link 85, respectively, a third link member 88 pivotally connected at opposite ends thereof to the other end of the L-shaped link 85 and the other end of the second intermediate link 151 respectively, and a fourth link member 123 pivotally connected at opposite ends thereof to the other end of the second intermediate link 151 and an upper end of the upright member 86 respectively.

The fixed plates 75, bar 84, first link member 152, and first intermediate link 150 constitute a linkage of the parallelogram. The first arm member 76, first intermediate link 150, second link member 87 and L-shaped link 85 constitute a linkage of the parallelogram. The third arm member 79, L-shaped link 85, third link member 88 and second intermediate link 121 constitute a linkage of the parallelogram. By driving the fourth DC servomotor 70 and fifth DC servomotor 71 and rotating same in opposite directions, the wrist 69 can be moved through the linkage 72 in rotary movement about the first pin 81 (X-direction) in the direction of an arrow a in FIG. 21. By rotating the fourth DC servomotor 70 and fifth DC servomotor 71 in the same direction, the wrist 69 can be moved through the linkage 72 about the second pin 83 (Z-direction) in the direction of an arrow b in FIG. 21.

The chuck 73 is mounted on an output shaft of a sixth DC servomotor 74 mounted on the second wrist member 82 in such a manner that the output shaft thereof is parallel to the Y-direction. By actuating the sixth DC servomotor 74, the chuck 73 can be rotated in the direction of an arrow c about the Y-direction.

The XYZ shifting section of the parts posture changing means 17 and the assembling means 18 are constructed as described hereinabove. Actuation of the first DC servomotor 65 moves the carriage 64 along the guide rods 63 in the X-direction. Actuation of the second DC servomotor 67 and third DC servomotor 68 moves the forward end of the arm 66 in the Y-direction and Z-direction. Actuation of the fourth DC servomotor 70 and fifth DC servomotor 71 causes the wrist 69 to rotate in the directions of the arrows a and b respectively. Actuation of the sixth DC servomotor 74 rotates the chuck 73 in the direction of the arrow c. Thus the chuck 73 has six degrees of freedom in the X-direction, Y-direction, Z-direction, a-direction, b-direction and c-direction, so that the part that has been positioned by the parts positioning means 15 and inverted, when necessary, is held by the chuck 73 and assembled on the chassis 10 after having its posture changed to a predetermined posture.

Figure 22:
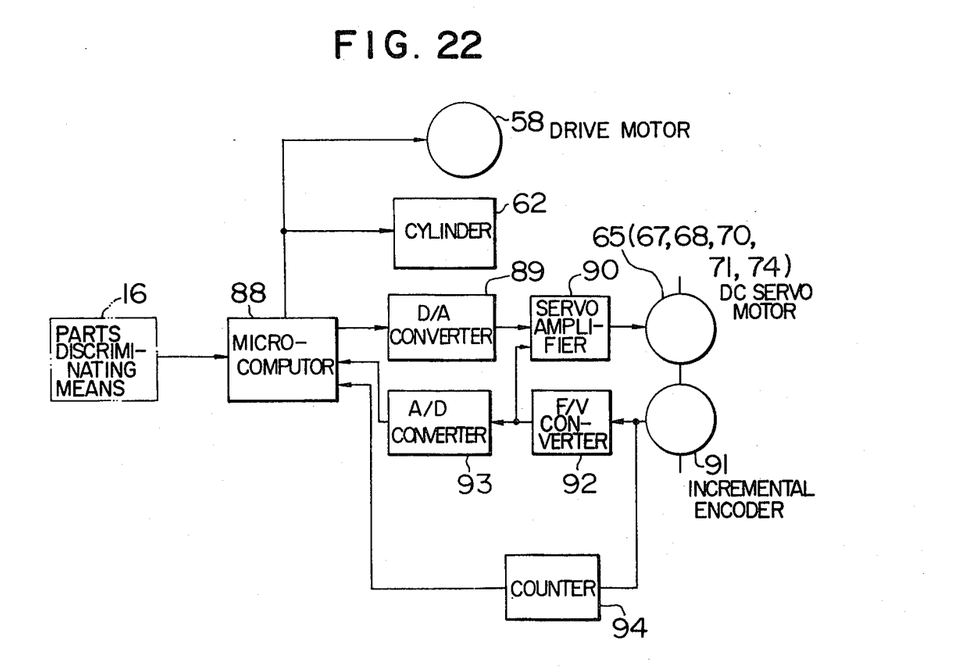
FIG. 22 is a block diagram of the system for controlling the operation of the arm portion.

A control system for controlling the operation of the parts posture changing means 17 performed in accordance with the result of discrimination of the parts by the parts discriminating means 16 will now be described by referring to FIG. 22. In the figure, only one axis (one DC servomotor) will be described.

In the figure, 16 designates the parts discriminating means, 88 is a microcomputer for effecting sampling control based on the result of discrimination of the parts effected by the parts discriminating means 16, and 58 and 62 are the drive motor and cylinder respectively driven by instructions given by the microcomputer 88. 89 is a D/A converter for converting digital signals from the microcomputer 88 into analog signals. 90 is a servo amplifier producing a servo output by an analog signal from the D/A converter 89. 65 (57, 68, 70, 71, 74) is the DC servomotor actuated by the servo output of the servo amplifier 90. 91 is an incremental encoder mounted on the DC servomotor 65 (67, 68, 70, 71, 74). 92 is an F/V converter for converting the pulse frequency of the incremental encoder 91 into a voltage. 93 is an A/D converter for converting an analog signal from the F/V converter 92 into a digital signal and feeding same to the microcomputer 88. 94 is a counter for feeding to the microcomputer 88 a positional signal obtained by counting the number of pulses of the incremental encoder 91.

Control of operation effected by the control system shown in FIG. 22 will be described. A series of pulses of the encoder 91 mounted on the DC servomotor 65 (67, 68, 70, 71 and 74) are counted by the counter 94 and stored in the microcomputer 88 as positional signals. The series of pulses are converted by the F/V converter 92 into voltages proportional to the speed, and changed by the A/D converter 93 into digital quantities which are stored in the microcomputer 88 as speed feedback signals. From the speed and positional signals obtained from the encoder 91, the microcomputer 88 calculates speed signals to be supplied to the DC servomotor 65 (67, 68, 70, 71, 74). Position control or speed control of the DC servomotor is effected by sampling control effected as described hereinabove.

Figure 23:
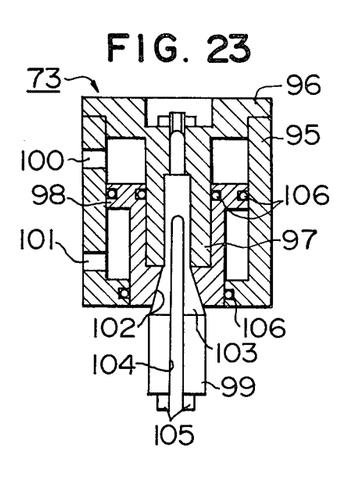
FIG. 23 is a sectional view of the chuck.

The operation of the chuck 73 will be described. As shown in FIG. 23, the chuck 73 includes a cylinder 95, a cover member 96 secured to an upper opening of the cylinder 65, a piston 98 slidably fitted in the cylinder 95 and also slidably receives therein a columnar portion 97 of the cover member 86 and a collet chuck 99 inserted in the columnar portion 97 of the cover member 96 and securely fixed therein. The cylinder 95 is formed in an upper portion and a lower portion with an air injecting and ejecting port 100 and an air injecting and ejecting port 101 respectively, and the piston is formed at its bottom with an upwardly tapering port 102. A downwardly tapering portion 103 is formed in a portion of the collet chuck 99 which is inserted in the upwardly tapering port 102 at the bottom of the piston 98, and the collet chuck 99 is formed with an axial slit 104 and with a downwardly extending projection 105 at the bottom. O-rings 106 are mounted in sliding portions of the cylinder 95 and piston 98 and sliding portions of the cylinder 95 and columnar portion 97 of cover member 96. When air under high pressure is injected through the upper air injecting and ejecting port 100 of the chuck 73 of the aforesaid construction, the piston 98 moves downwardly and the tapering portion 103 of the collet chuck 99 is pushed by the tapering port 102 of the piston 98 to close the port 102. Conversely, when the air under pressure is injected into the lower air injecting and ejecting port 101, the piston 98 moves upwardly and the collet chuck 99 opens the chuck 73 by its own resilience. Thus by inserting the projection 105 of the collet chuck 99 in a hole of a part while the collet chuck 99 is closed and then opening the collet chuck 99 later, it is possible to grip the part with the hole by the chuck 73. When a part in the form of an elongated member is to be gripped, such part can be gripped by reversing the aforesaid process. When the part is a platelike member, the part can be gripped by using the slit 104 formed in the collet chuck 99.

The embodiment of the parts feeding and assembling system in conformity with the invention is of the aforesaid construction. The parts supplied to the multiple stage vibration feeder 12 are transferred by vibration to the separation unit 13 where they are separated to individual parts and conveyed through the conveyor chute means 14 to the parts positioning means 15. The parts have their posture and position determined by the parts positioning means 15 and discriminated by the parts discriminating means 16. Then the parts are assembled on the chassis 10 in a predetermined posture and in a predetermined position by the parts posture changing means 17 and assembling means 18 in accordance with the results of discrimination effected by the parts discriminating means 16. Thus the parts feeding and assembling system is more advantageous than the prior art. In the prior art, only one type of parts can be fed and assembled by the assembling system of the type in which a part first has its posture corrected and then fed and assembled while keeping the part in the correct posture. The present invention enables a multiplicity of types of parts of a substantial range to be automatically fed and assembled.

When the parts discriminating means 16 described with reference to the aforesaid embodiment is used, calculation can be performed quickly and the system has high versatility.

The use of the chuck 73 of the aforesaid construction enables a part formed with a hole, a part of an elongated shape and a part of a plate shape to be readily gripped.

Figure 24:
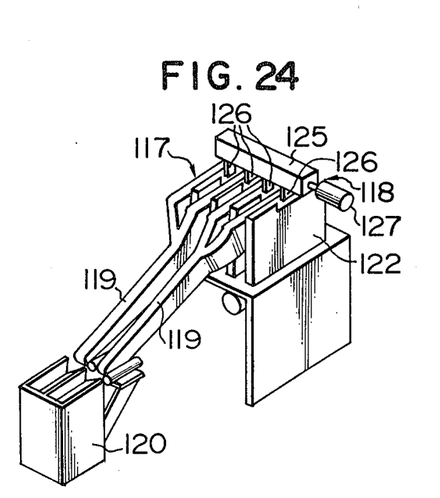
FIG. 24 is a schematic perspective view of the means for separating, feeding and assembling the plate-shaped part shown in FIG. 4.

FIG. 24 shows a modification of the invention which is suitable for separating, feeding and assembling plate-shaped parts as shown in FIGS. 2 and 3. The modification of the parts feeding and assembling system in conformity with the invention shown in FIG. 24 is used for feeding and assembling plate-shaped parts difficult to handle by the vibration feeder 12. The multiple stage vibration feeder 12, separating unit 13, conveyor chute means 14, parts positioning means 15 and the inverting section of parts posture changing means 17 of the embodiment shown in FIG. 4 are replaced by a magazine feeder 117, separating unit 118, conveyor chute means 119 and parts positioning and inverting means 120.

Figures 25, 26:
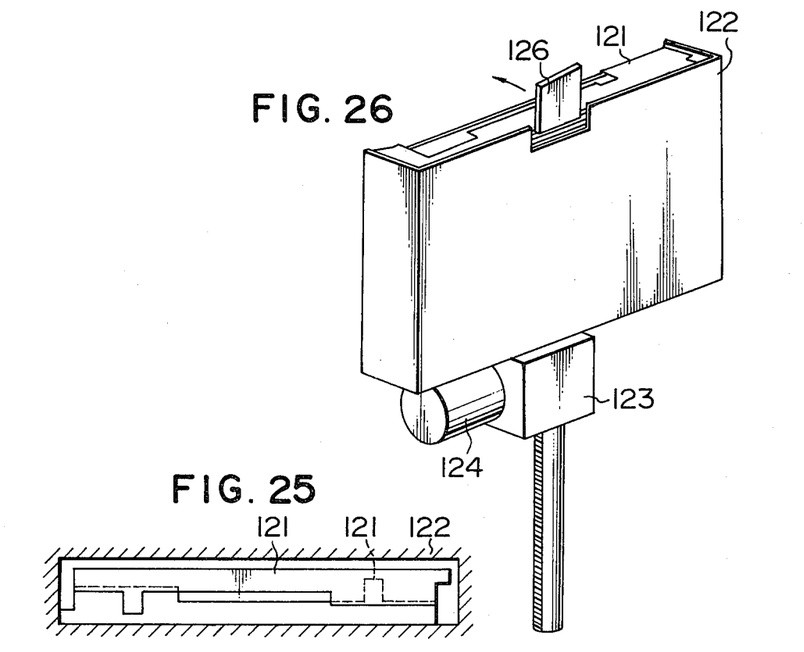
FIG. 25 is a sectional view of the magazine.
FIG. 26 is a perspective view of the magazine.

Referring to FIGS. 25 and 26, the magazine feeder 117 includes four magazines 122 disposed in side-by-side relation for receiving therein plate-shaped parts 121 of a substantial range of types without regard to surface and undersurface, front and rear and left and right of the parts, a vertical slider 123 disposed below the magazines 122 and a motor 124 for actuating the vertical slider 123. As the motor 124 is driven, the vertical slider 123 is actuated to move the plate-shaped parts a distance corresponding to the thickness of one part 121.

Referring to FIG. 24 again, the separating unit 118 includes a main body 125 disposed on the magazine feeder 117, a plurality of claws 126 mounted on the main body 125 and each positioned against one of the magazines 122 for sliding movement in the direction of an arrow shown in FIG. 26 and a cylinder 127 connected to the claws 126 for moving same. As the claws 126 are caused to move in sliding movement in the direction of the arrow by the cylinder 127, the uppermost plate-shaped part 121 of the parts 121 moved upwardly by the magazine feeder 117 is moved downwardly by each claw 126 onto the conveyor chute means 119.

The conveyor chute means 119, which is of a shape enabling plate-shaped parts 121 of a substantial range of types to be conveyed in free posture, is mounted between the separating unit 118 and the parts positioning and inverting means 120 in such a manner that the parts conveyed thereby can be suitably joined to each other.

Figure 27:
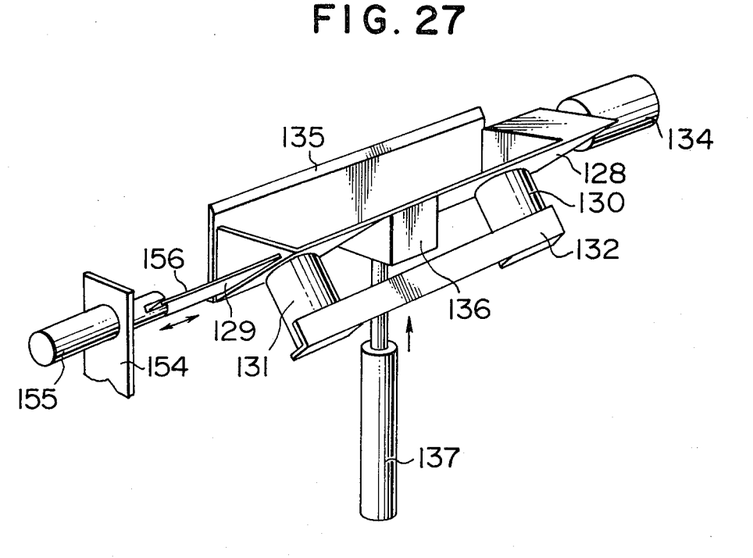
FIGS. 27 and 28 are perspective views of the parts positioning and inverting means.
Figure 28:
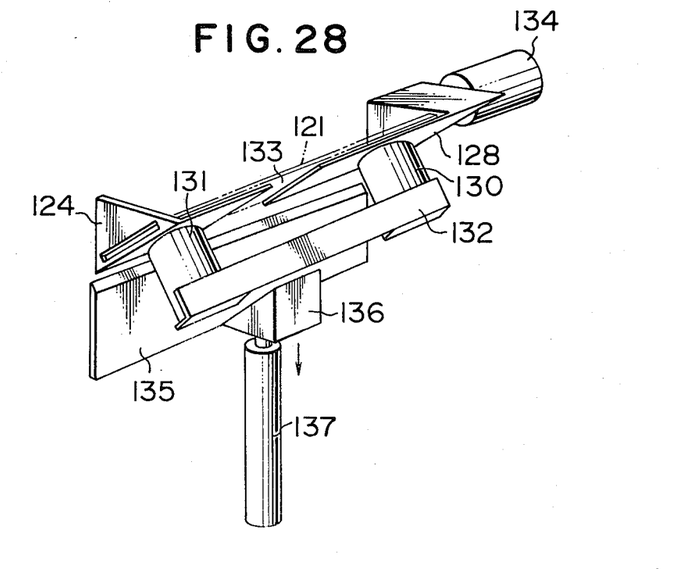
Figure 29:
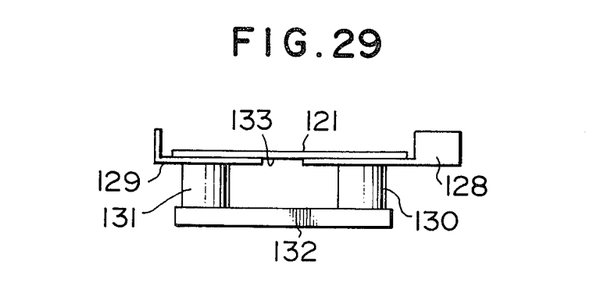
FIG. 29 is a plan view of the parts positioning and inverting means shown in FIGS. 27 and 28.
Figure 30:
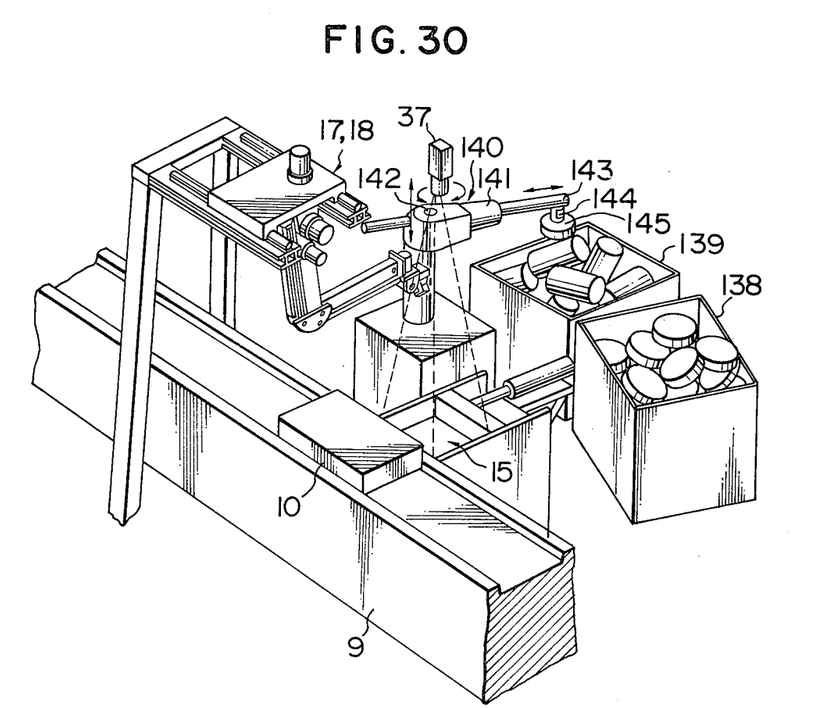
FIG. 30 is a schematic side view of the parts feeding and assembling system comprising another embodiment of the invention.

The parts positioning and inverting means 120 consists of two identical units. Each unit of the means 120 includes, as shown in FIGS. 28–30, L-shaped receivers 128 and 129, electromagnets 130 and 131 mounted on the L-shaped receivers 128 and 129 respectively, a connecting bar 132 interconnecting the two electromagnets 130 and 131 so that the two receivers 128 and 129 may be spaced apart from each other by a gap 133, a motor 134 connected to the receiver 128, a stopper plate 135 inclined by about 30 degrees with respect to the receivers 128 and 129 for closing one side of the receivers 128 and 129, an intermediate receiver 136 disposed in the gap 133 between the two receivers 128 and 129 and a cylinder 137 for vertically moving the stopper plate 135 and intermediate receiver 136. Actuation of the cylinder 137 moves the stopper plate 135 and intermediate receiver 136 upwardly so that the former closes one side of the receivers 128 and 129 and the latter moves into a position between the two receivers 128 and 129. As shown in FIG. 29, a pusher 156 is connected to a cylinder 155 mounted on a bracket 154 for pressing against the plate-shaped part 121 for tentatively positioning same.

As the plate-shaped part 121 is conveyed by the conveyor chute means 119, a current is passed to the electromagnets 130 and 131 so as to electromagnetically grip the plate shaped part 121 at its opposite ends and tentatively position same. Then, the motor 134 is suitably driven in accordance with the result of discrimination effected by the parts discriminating means 16 to invert the plate-shaped part 121 which is gripped by the chuck 73 in the gap 133 between the two receivers 128 and 129.

Assume that there are five different types of rod-shaped parts A, B, C, D and E and that one product requires four parts of type A and one part each of types B–E to be assembled. In this case, parts of type A are placed in the feeders 12a and 12b, and parts of type B, C, D and E are placed in feeders 12c, 12d, 12e and 12f respectively. The positioning means may consists of units of a number suitable for allowing the assembling robot to perform fully by taking into consideration the frequency of use and the time required for separating and feeding the parts. That is, the positioning means preferably consists of four units, one being associated with the feeder 12a, one being associated with the feeder 12b, one being associated with the feeders 12c and 12d and one being associated with the feeders 12e and 12f.

Assume that there are four types of plate-shaped parts and that one product requires one part each of types F, G, H and I to be assembled. In this case, the magazines 122a, 122b, 122c and 122d contain therein parts of types F, G, H and I respectively. The positioning means consists of two units, one being associated with the magazines 122a and 122b and one being associated with the magazines 122c and 122d. In view of the possibilities that the order in which the parts are assembled may be varied, it is possible to reduce the number of units of the positioning means below one half the number of parts assembled to produce a product.

FIG. 30 is a perspective view of the parts feeding and assembling system comprising another embodiment of the invention. This embodiment has particular utility in assembling parts, such as a motor housing, which are large in size and not plate-like in shape that cannot be handled by a vibration feeder or magazine feeder. The multiple stage vibration feeder 12, separating unit 13 and conveyor chute means 14 of the first embodiment and the magazine feeder 117, separating unit 118 and conveyor chute means 119 of the modification of the first embodiment are replaced by parts collecting boxes 138, 139 . . . and a parts transferring arm 140.

The parts collecting boxes 138, 139 . . . are disposed around the parts transferring arm 140 for collecting the parts therein.

The parts transferring arm 140 includes an arm member 141 supported by a shaft 142 for rotation and vertical movement substantially in the center of the parts collecting boxes 138 and 139. The arm member 141 has a support rod 163 fitted therein for sliding movement and having an electromagnetic chuck 145 connected to its forward end through a strain gauge 144. By suitably rotating and moving the arm member 141 vertically and suitably moving the support rod 143 in sliding movement, it is possible to grip a part by the electromagnetic chuck 145 in the parts collecting boxes 138, 139 . . . At this time, the strain gauge 144 measures the weight of the part gripped by the electromagnetic chuck 145. When more than two parts are gripped, the gripped parts are released; when no part is gripped, the arm member 141 is actuated again to grip a part. When the electromagnetic chuck 145 grips one part, the part is transferred to the parts positioning means 15.

From the foregoing description, it will be appreciated that the parts feeding and assembling system according to the invention first feeds parts irrespective of their posture and then assemble them after correcting their posture. Thus the system is capable of feeding parts of multiplicity of types of a substantial range and assembling them by replacing the chuck of the assembling means by a suitable chuck, and is more versatile than a parts feeding and assembling system of the prior art which feeds and assembles only one type of parts. The system according to the invention has particular utility in feeding and assembling parts of a variety of type or parts often encountering design changes.

What is claimed is:

1. A parts feeding and assembling system comprising:
    a parts supply containing a multiplicity of parts constructed for being assembled into an assembly of parts in a specific direction;
    separating and feeding means for separating each of said parts from the multiplicity of parts in said part supply in a random orientation and for feeding each separated, randomly oriented part to a positioning station;
    tentative positioning means for tentatively positioning parts fed to said positioning station;
    visual discriminating means for optically determining the orientation of a part tentatively positioned by said tentative positioning means in said positioning station and whether it corresponds to a correct assembly orientation;
    orientation changing means for changing the orientation of a part tentatively positioned by said tentative positioning means to a correct assembly orientation in response to a determination by said visual discriminating means that the position of said part does not correspond to a correct assembly orientation;
    assembling means for assembling each part into an assembly of parts disposed at a predetermined location after the part is correctly oriented by said orientation changing means or is determined to be correctly oriented by said visual discriminating means.

2. A parts feeding and assembling system as claimed in claim 1, wherein said assembling means comprises an assembling robot provided with said orientation changing means.

3. A parts feeding and assembling system according to claim 1, wherein said orientation changing means comprises an inverting means for inverting tentatively positioned parts determined to be inversely oriented relative to a correct assembly orientation.

4. A parts feeding and assembling system as claimed in claim 1 or 3, wherein said visual discriminating means comprises parts discriminating means for determining a horizontal orientation of parts tentatively positioned by said tentative positioning means in a horizontal direction, and wherein said orientation changing means comprises a rotating means for rotating said part through a predetermined angle in a horizontal direction in accordance with the determination of the horizontal orientation of parts produced by said parts discriminating means.

5. A parts feeding and assembling system as claimed in claim 1, wherein said visual discriminating means comprises a photographing means for photographing an optical image of each part, means for preparing a dictionary pattern by setting possible reference points in a plurality of closed partial zones composed of the contour of the part of all the image signals of the part and background obtained by said photographing means, selecting as reference points those possible reference points which do not bring identical information on discrimination of the part, and combining the image information of such reference points that have been selected, and a comparator circuit for comparing said dictionary pattern with the information on the reference points contained in the image signals obtained by said photographing means.

6. A parts feeding and assembling system as claimed in claim 1 or 2 or 5, wherein said parts supply includes a plurality of stock units and said tentative positioning means consists of a plurality of units smaller in number than the number of said stock units and the parts fed to a station at which said tentative positioning means is disposed are joined to one another while being fed to the positioning means.

* * * * *